United States Patent
Furuki

[11] Patent Number: 6,166,475
[45] Date of Patent: Dec. 26, 2000

[54] BRUSHLESS MOTOR AND MAGNETIC RECORDING-REPRODUCING APPARATUS USING THE SAME

[75] Inventor: Shigeru Furuki, Fukushima-ken, Japan

[73] Assignee: Alps Electric Co., Ltd., Japan

[21] Appl. No.: 09/439,854

[22] Filed: Nov. 12, 1999

[30] Foreign Application Priority Data

Nov. 18, 1998 [JP] Japan .................................. 10-327790

[51] Int. Cl.[7] ................................................ M02K 1/22
[52] U.S. Cl. ...................... 310/261; 310/269; 360/99.08
[58] Field of Search .................................. 310/261, 269, 310/156; 29/596; 360/99.08

[56] References Cited

U.S. PATENT DOCUMENTS

| | | | |
|---|---|---|---|
| 4,719,378 | 1/1988 | Katsuma et al. | 310/67 R |
| 5,469,421 | 11/1995 | Aruga et al. | 369/75.1 |
| 5,783,884 | 7/1998 | Fujishima et al. | 310/90 |
| 5,831,355 | 11/1998 | Oku | 310/42 |
| 5,926,663 | 7/1999 | Suzuki | 396/449 |
| 6,020,663 | 2/2000 | Furuki | 310/68 B |
| 6,044,737 | 4/2000 | Yao et al. | 83/13 |
| 6,081,058 | 6/2000 | Suzuki et al. | 310/156 |

FOREIGN PATENT DOCUMENTS

| | | |
|---|---|---|
| 112649 | 4/1992 | Japan . |
| 09106601A | 4/1997 | Japan . |
| 09139017A | 5/1997 | Japan . |

*Primary Examiner*—Nestor Ramirez
*Assistant Examiner*—Joseph Waks
*Attorney, Agent, or Firm*—Brinks, Hofer, Gilson & Lione

[57] ABSTRACT

A brushless motor comprises a stator including substrates protruding radially with respect to a center axis and coils wound on the substrates, a rotor including a cover covering the stator, having magnetic poles annularly arranged opposing tip-end faces of the substrates, and a plurality of apertures provided in the upper wall of the cover, wherein the magnetic poles provided inside the upper wall of the cover and the tip-end faces of the substrates are visible from the outside of the upper wall through the apertures.

8 Claims, 6 Drawing Sheets

BRUSHLESS MOTOR AND MAGNETIC RECORDING-REPRODUCING APPARATUS USING THE SAME

BACKGROUND OF THE INVENTION

1. Field of the Invention

The present invention relates to a brushless motor and a magnetic recording-reproducing apparatus using the same.

2. Description of the Related Art

Hitherto, known brushless motors have been used as spindle motors for rotating, for example, floppy disks (FD) in magnetic recording-reproducing apparatuses. One brushless motor comprises a stator including a plurality of substrates radially protruding from a central shaft and coils wound on each of the plurality of substrates, and a rotor including a cover for covering the stator, the cover having a plurality of magnetic poles annularly arranged opposing the tip-end faces of the plurality of substrates.

A known brushless motor used for a magnetic recording-reproducing apparatus is described as follows in conjunction with drawings.

FIG. 6 is a sectional view showing a known brushless motor. FIG. 7 is an expanded sectional view showing the section VII of the brushless motor shown in FIG. 6. FIG. 8 is a plan view showing a rotor of the known brushless motor. FIG. 9 is a plan view showing a stator and a reinforcing plate of the known brushless motor.

In FIGS. 6 to 9, the known brushless motor of generally 3 mm in thickness, including a stator 10, a rotor 20, and a reinforcing plate 30, is driven by three-phase alternating current.

The stator 10 includes the following parts or components: a rotatable center shaft 11; a bearing unit 12 of an oil-retaining metal receiving the center shaft 11; a bearing case 13 holding the bearing unit 12 together with the center shaft 11; twenty-four substrates 14-1 to 14-24 radially protruding from the peripheral face of the bearing case 13 with a constant angular distance of 15 degrees (360 degrees/24=15 degrees) from each other; coils 15-1 to 15-24, each coil being wound on each of yokes 14a-1 to 14a-24 of the substrates 14-1 to 14-24; and three position-detecting Hall elements 16, each element being disposed at a predetermined position, for example, between two adjacent substrates 14.

The rotor 20 of a magnetized planar material made by a cutting and drawing process includes a cover 21 having a round upper wall 21a and an annular peripheral wall 21b, and thirty-two magnetic poles 22-1 to 22-32 annularly arranged inside the upper wall 21a and the peripheral wall 21b of the cover 21, with a constant angular distance between each. The magnetic poles 22-1 to 22-32 are disposed in contact with a corner section where the upper wall 21a and the peripheral wall 21b merge with each other.

The annularly arranged magnetic poles 22-1 to 22-32 are evenly disposed so as to have a constant angular distance of 11.25 degrees (360 degrees/32=11.25 degrees) from each other, and to have small spaces 23-1 to 23-32 between each other. In the rotor 20, the upper wall 21a is fixed at its center to the center shaft 11 by appropriate means, and is disposed to cover the stator 10, such that tip-end faces of the substrates 14-1 to 14-24 are disposed opposing the magnetic poles 22-1 to 22-32.

Generally, a three-phase brushless motor includes 3N coils in the stator, and 4N magnetic poles in the rotor (N represents an integer of 1 or greater).

The reinforcing plate 30 is made of a planar metallic material, for example, of steel being cut into a generally rectangular shape, provided with an aperture 31 at a predetermined position (refer to FIG. 6). The bearing case 13, passing through the aperture 31, is fixed to the reinforcing plate 30 by appropriate means.

When three phases of an alternating current are represented by U, V, and W, the phase-U current flows through the coils 15-1, 15-4, 15-7, ... 15-22, the phase-V current flows through the coils 15-2, 15-5, 15-8, ... 15-23, and the phase-W current flows through the coils 15-3, 15-6, 15-9, ... 15-24.

Three position-detecting Hall elements 16 are provided, the elements corresponding to the phase-U, phase-V, and phase-W currents.

Following is a description of the operation of a known brushless motor arranged as described above.

The rotor 20 rotates around the stator 10 with three-phase alternating current supplied from a three-phase alternating current source.

A phase-U position-detecting Hall element 16-1 controls the switching timing of the phase-U current by detecting a magnetic flux change according to the position of each of the magnetic poles 22-1 to 22-32 included in the rotor 20, that is, a magnetic flux change arising from the approach of each of the spaces 23-1 to 23-32. A phase-V position-detecting Hall element 16-2 and a phase-W position-detecting Hall element 16-3 also control the switching timing of the phase-V current and the phase-W current, respectively.

The rotor 20 can be rotated at a predetermined stabilized speed by thus controlling the switching timing of the current in each of the phases U, V, and W.

Now, magnetic paths between the magnetic poles 22 of the rotor 20 and the substrates 14 of the stator 10 are described as follows.

In FIG. 7, most of the magnetic paths from the magnetic poles 22 to the substrates 14 function as effective magnetic paths 40, while the remainder of the magnetic paths from the magnetic poles 22 becomes ineffective magnetic paths 41 and 42. The ineffective magnetic paths 41 are formed between the magnetic poles 22 and the upper wall 21a of the cover 21. The ineffective magnetic paths 42 are formed between the magnetic poles 22 and the reinforcing plate 30.

The effective magnetic paths 40 contribute to generation of the brushless motor torque, while the ineffective magnetic paths 41 and 42 do not contribute to the rotation of the motor.

A problem of the known brushless motor is found in that portions of the magnetic paths generated from the magnetic poles 22 of the rotor 20 to the upper wall 21a and the reinforcing plate 30 are ineffective for the brushless motor torque, thereby decreasing the effective magnetic paths formed between the magnetic poles 22 and the substrates 14, resulting in an inefficient motor.

SUMMARY OF THE INVENTION

Accordingly, it is an object of the present invention to provide a brushless motor and a magnetic recording-reproducing apparatus using the same, in which all magnetic paths between magnetic poles and substrates are used for effectively generating motor torque.

To this end, the present invention provides a brushless motor which comprises a stator including a plurality of substrates protruding radially with respect to a center axis of the stator, and a plurality of coils, each coil being wound on each of the substrates; a rotor including a cover having a plurality of annularly arranged magnetic poles, for covering the stator, wherein the magnetic poles are disposed opposing tip-end faces of the substrates; and a plurality of first apertures provided in the upper wall of the cover, such that the magnetic poles provided inside the upper wall of the cover and the tip-end faces of the substrates are visible from the outside of the upper wall through the first apertures.

The stator of the brushless motor according to the present invention may be retained by a reinforcing plate of a magnetic material, which includes a plurality of second apertures, wherein the magnetic poles are visible from the outside of a bottom surface of the reinforcing plate through the second apertures.

The first apertures provided in the upper wall of the cover of the brushless motor according to the invention may be sealed with a nonmagnetic sealing material.

The above-described arrangement of the brushless motor according to the present invention preferably satisfies the following expression:

$$(Z1+Z2+\ldots) = N \times P \times A$$

wherein A represents an integer of 1 or greater, N represents the number of phases forming a currency for the brushless motor, P represents an angular pitch between each of the substrates, C represents the number of the substrates, C and P satisfy $C \times P = 360$ degrees, and $(Z1+Z2+\ldots)$ represents the sum of angular distances (Z1 degrees, Z2 degrees, . . . ) between both ends of each of the first apertures in the upper wall of the cover.

As described above, in the brushless motor according to the present invention, ineffective magnetic paths in the magnetic paths formed between the magnetic poles and the substrates, which do not contribute to motor torque, can be reduced compared with a known motor by providing a plurality of apertures in the upper wall of the cover, so that the magnetic poles provided inside the upper wall of the cover and the tip-end faces of the substrates are visible from the outside of the upper wall of the cover. As a result, effective magnetic paths between the magnetic poles and the substrates increase, thereby enabling an efficient high-torque brushless motor.

The brushless motor according to the present invention may include a stator retained by a reinforcing plate of a magnetic material, the reinforcing plate being provided with a plurality of apertures so that the magnetic poles are visible from the outside of a bottom surface of the reinforcing plate, whereby the ineffective magnetic paths, which do not contribute to the motor torque, between the magnetic poles and the substrates may be further reduced. As a result, the effective magnetic paths between the magnetic poles and the substrates may increase, thereby enabling a more efficient higher-torque brushless motor.

The apertures in the upper wall of the cover of the brushless motor according to the present invention may be sealed by a nonmagnetic sealing material, which prevents the strength of the upper wall from being reduced due to the apertures, thus, the rotation of the rotor can be maintained in a stabilized state. The apertures sealed by a sealing material may prevent the brushless motor from receiving foreign particles or dust.

The configuration of the brushless motor according to the present invention, satisfying the following expression may exhibit a uniform magnetic interaction between the stator and the rotor, thereby enabling an efficient brushless motor with low irregularity in motor torque:

$$(Z1+Z2+\ldots) = N \times P \times A$$

wherein A represents an integer of 1 or greater, N represents the number of phases forming a current for the brushless motor, P represents an angular pitch between each of the substrates, C represents the number of the substrates, C and P satisfy $C \times P = 360$ degrees, and $(Z1+Z2+\ldots)$ represents the sum of angular distances (Z1 degrees, Z2 degrees, . . . ) between both ends of each of the generally arc-shaped apertures in the upper wall of the cover.

The present invention also offers a magnetic recording-reproducing apparatus using an efficient high-torque brushless motor according to the present invention, which can perform recording and reproducing in a stabilized state and with low electricity consumption.

DESCRIPTION OF THE PREFERRED EMBODIMENTS

Figure 1:
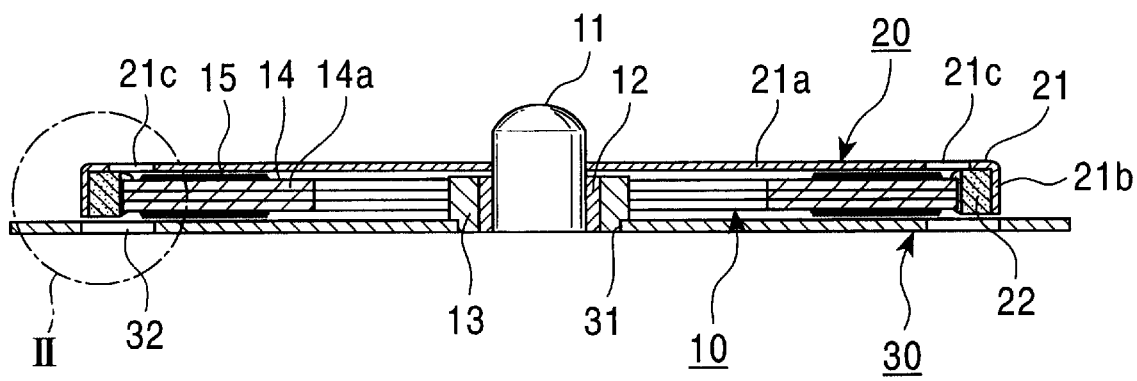
FIG. 1 is a sectional view showing a brushless motor according to an embodiment of the present invention.
Figure 2:
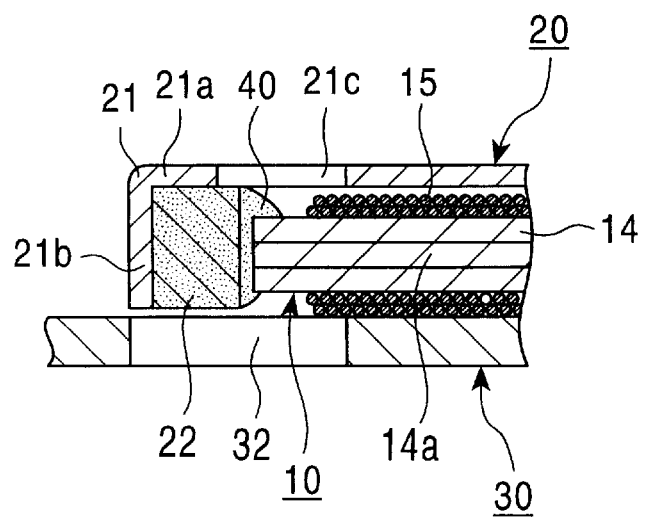
FIG. 2 is an expanded sectional view showing a section II of the brushless motor shown in FIG. 1.
Figure 3:
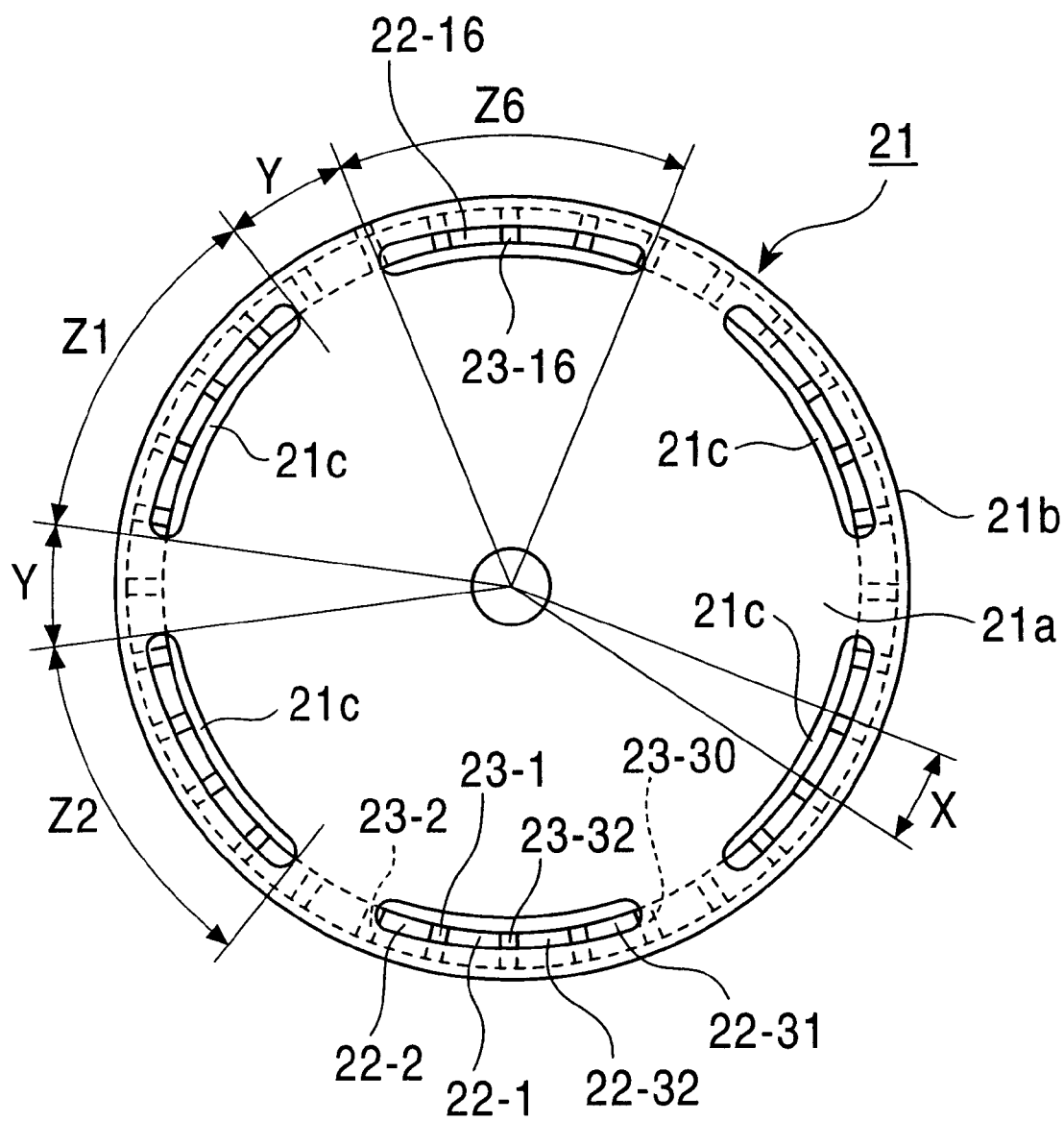
FIG. 3 is a plan view showing a rotor of the brushless motor according to the embodiment of the present invention.
Figure 4:
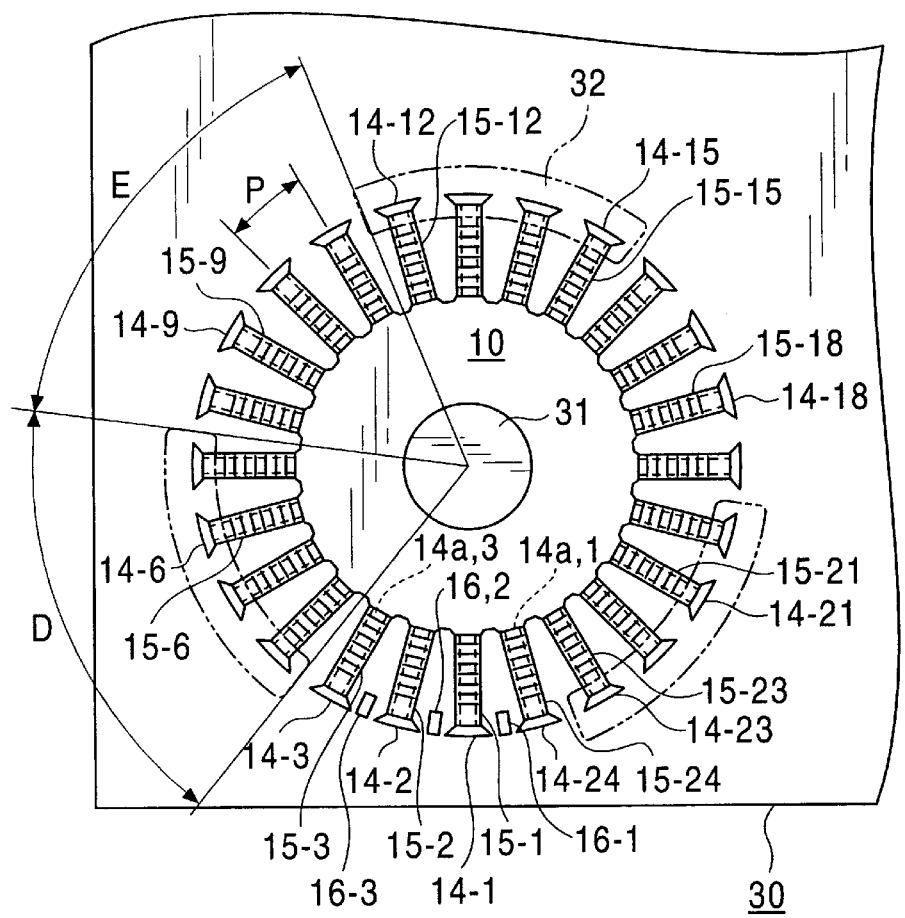
FIG. 4 is a plan view showing a stator and a reinforcing plate of the brushless motor according to the embodiment of the present invention.

A brushless motor according to a first embodiment of the present invention is described below, in conjunction with the drawings. FIG. 1 is a sectional view showing a brushless motor according to the invention, FIG. 2 is an expanded sectional view showing a section II of the brushless motor in FIG. 1, FIG. 3 is a plan view showing a rotor of the brushless motor according to the invention, and FIG. 4 is a plan view showing a stator and a reinforcing plate of the brushless motor according to the present invention. When the same units of the brushless motor according to the present invention as of the known brushless motor shown in FIGS. 6 to 9 are referred to, those units are represented by the same numerals and symbols as of the known brushless motor.

In FIGS. 1 to 4, the brushless motor according to the present invention, being thin and with a thickness of generally 3 mm, includes a stator 10, a rotor 20, and a reinforcing plate 30, which is driven by three-phase alternating current, each phase represented by U, V, or W.

The stator 10 includes the following parts or components: a rotatable center shaft 11; a bearing unit 12 of an oil-retaining metal for receiving the center shaft 11; a bearing case 13 holding the bearing unit 12 together with the center shaft 11; twenty-four substrates 14-1 to 14-24 radially protruding from the peripheral face of the bearing case 13 with a constant angular distance of P degrees, for example, 15 degrees, between each (360 degrees/24=15 degrees), coils 15-1 to 15-24, each coil being wound on each of yokes 14a-1 to 14a-24 of the substrates 14-1 to 14-24, respectively, and three position-detecting Hall elements 16, each element being disposed at a predetermined position, for example, between two adjacent substrates 14.

The rotor 20 of a magnetized planar material made by a cutting and drawing process includes a cover 21 having a round upper wall 21a provided with a plurality (for example, six) of arc-shaped-channel apertures 21c, and an annular peripheral wall 21b formed by drawing the upper wall 21a. The rotor 20 also includes a plurality (for example, thirty-two) of magnetic poles 22-1 to 22-32 annularly arranged inside the upper wall 21a and the peripheral wall 21b of the cover 21. The magnetic poles 22-1 to 22-32 are disposed in contact with a corner section where the upper wall 21a and the peripheral wall 21b merge with each other.

In FIG. 3, a plurality (for example, six) of the arc-shaped-channel apertures 21c are formed in the upper wall 21a of the cover 21, annularly arranged with an equal distance from each other, and adjacent to the corner with the peripheral wall 21b. Particularly, the arc-shaped-channel apertures 21c are formed so that all of the angular distances (Z1 degrees, Z2 degrees, . . . ) between both ends of each of the apertures with respect to the center of the cover 21 are the same Z, for example, 45 degrees. The arc-shaped-channel apertures 21c are disposed so that the angular distances from the ends of the apertures to the adjacent end of the adjacent aperture 21c, with respect to the center of the cover 21, are the same Y, for example, 15 degrees.

The annularly arranged magnetic poles 22-1 to 22-32 are evenly disposed so as to have a constant angular distance of X degrees, for example, 11.25 degrees (360 degrees/32= 11.25 degrees) from each other, and to have small spaces 23-1 to 23-32 between each other. In the rotor 20, the upper wall 21a is fixed at its center to the center shaft 11 by appropriate means, the upper wall 21a being disposed to cover the stator 10, such that tip-end faces of the substrates 14-1 to 14-24 are disposed opposing the magnetic poles 22-1 to 22-32.

The arc-shaped-channel apertures 21c are disposed in the upper wall 21a so that the magnetic poles 22 and the tip-ends of the substrates 14 are visible from the outside of the upper wall 21a, when the upper wall 21a is disposed to cover the stator 10.

The reinforcing plate 30 is made of a planar metallic material, for example, of steel being cut into a generally rectangular shape, provided with an opening 31 at a predetermined position. The bearing case 13, passing through the aperture 31, is fixed to the reinforcing plate 30 by appropriate means. In FIG. 4, a plurality (for example, three) of arc-shaped-channel apertures 32 are disposed with a constant angular distance of D degrees, for example, 60 degrees, between both ends of the aperture 32 with respect to the center of the opening 31, and with a constant angular distance of E degrees, for example, 60 degrees, from an end of the aperture 32 to the adjacent end of the adjacent aperture with respect to the center of the opening 31. The arc-shaped-channel apertures 32 are provided so that the magnetic poles 22 are visible from the outside of the bottom face of the reinforcing plate 30, when the rotor 20 is disposed on the reinforcing plate 30.

When three phases of an alternating current are represented by U, V, and W, the phase-U current flows through the coils 15-1, 15-4, 15-7, . . . 15-22, the phase-V current flows through the coils 15-2, 15-5, 15-8, . . . 15-23, and the phase-W current flows through the coils 15-3, 15-6, 15-9, . . . 15-24.

Three position-detecting Hall elements 16 are provided, the elements corresponding to the phase-U, phase-V, and phase-W currents.

Following is a description of the operation of a brushless motor arranged as described above, according to the present invention.

The rotor 20 is rotated around the stator 10 by three-phase alternating current supplied from a three-phase alternating current source.

A phase-U position-detecting Hall element 16-1 controls the switching timing of the phase-U current by detecting a magnetic flux change according to the position of each of the magnetic poles 22-1 to 22-32 included in the rotor 20, that is, a magnetic flux change arising from the approach of each of the spaces 23-1 to 23-32. A phase-V position-detecting Hall element 16-2 and a phase-W position-detecting Hall element 16-3 also control the switching timing of the phase-V current and the phase-W current, respectively.

The rotor 20 can be rotated at a predetermined stabilized speed by thus controlling the switching timing of the current in each of the phases U, V, and W.

According to the present invention, magnetic paths between the magnetic poles 22 of the rotor 20 and the substrates 14 of the stator 10 are described as follows.

In FIG. 2, most of the magnetic paths from the magnetic poles 22 to the substrates 14 function as effective magnetic paths 40 in the area which is provided with the arc-shaped-channel apertures 21c in the upper wall 21a and the arc-shaped-channel apertures 32 in the reinforcing plate 30, which contribute to the brushless motor torque. That is, the number of ineffective magnetic paths is reduced in the magnetic paths produced between the magnetic poles 22 and the substrates 14 in the area in which the apertures 21c and the apertures 32 are provided, thereby reducing torque loss and improving the efficiency of the motor.

In the brushless motor according to the present invention, a description follows of the angular pitch of the substrates provided in the stator, and the angular distance of the plurality of apertures substantially annularly arranged in the upper wall of the cover of the rotor.

In an N-phase (for example, 3-phase) brushless motor, when the angular pitch of the substrates 14 is P degrees, for example, 15 degrees (if there are C substrates, C×P=360 degrees), angular distances between both ends of each of the apertures 21c are Z1 degrees, Z2 degrees, . . . (for example, 45 degrees each), and the sum of the angular distances is (Z1+Z2+ . . . ), the brushless motor is arranged so as to satisfy following expression.

$$(Z1+Z2+ \ldots )=N \times P \times A$$

(A represents an integer of 1 or greater)

With this arrangement, each of the substrates 14 in the stator, corresponding to each of the N phases, for example, phase U, V, or W, is disposed so that the magnetic interaction between the effective magnetic paths generated from each of the magnetic poles 22 of the rotor to the substrates 14, which contribute to the motor torque, and the ineffective magnetic paths, which do not contribute to the motor torque, is uniform in each of the apertures 21c. Thus, the effective magnetic paths and the ineffective magnetic paths between the stator 10 and the rotor 20 magnetically interact in a stabilized state, thereby reducing irregularity of the motor torque in N phases, for example, 3 phases.

By computing the above expression using the values given in the above example of the arrangement of the brushless motor according to the present invention, namely $$(Z1+Z2+\ldots)=45\ (\text{degrees})\times 6=270\ \text{degrees}$$

$$3\ (\text{phases})\times 15\ (\text{degrees})\times 6\ (\text{integer of 1 or more})=270\ \text{degrees},$$

it is found that the above expression is satisfied.

There follows a description of a second embodiment of the present invention.

Figure 5:
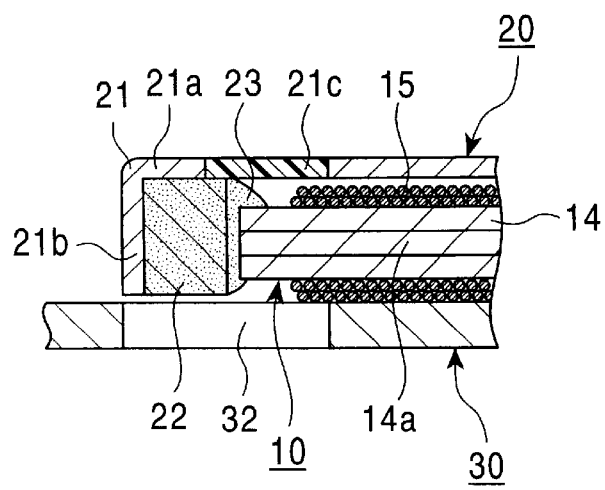
FIG. 5 is an expanded sectional view showing the section II of the brushless motor shown in FIG. 1, according to another embodiment of the present invention.
Figure 6:
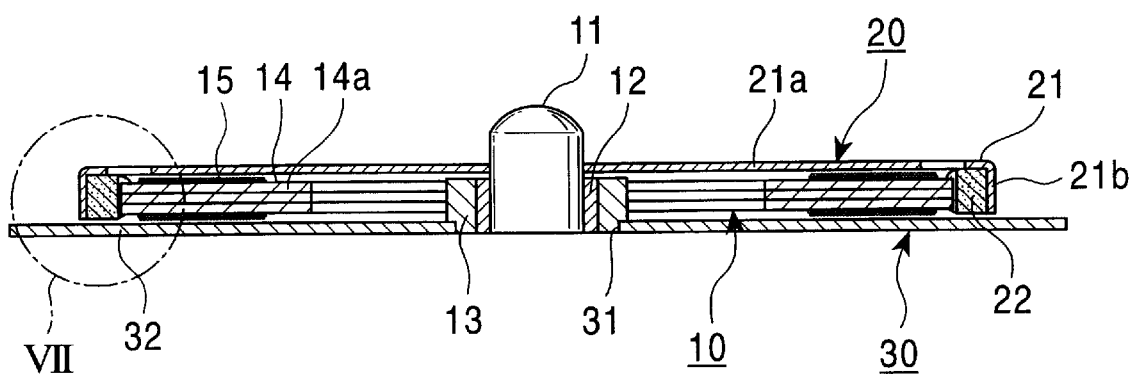
FIG. 6 is a sectional view showing a known brushless motor.
Figure 7:
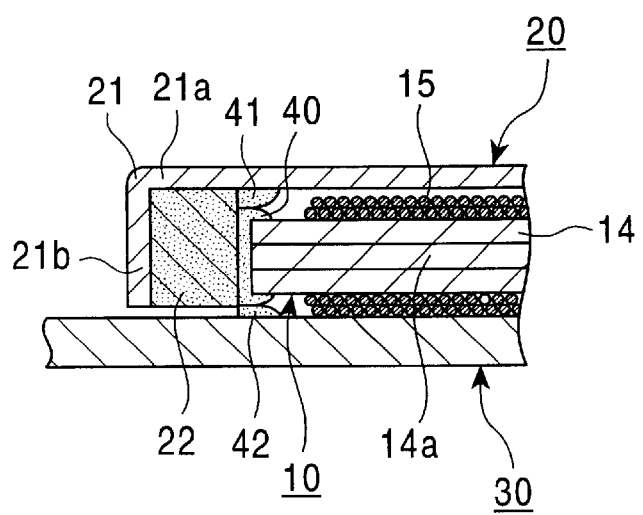
FIG. 7 is an expanded sectional view showing a section VII of the known brushless motor shown in FIG. 6.
Figure 8:
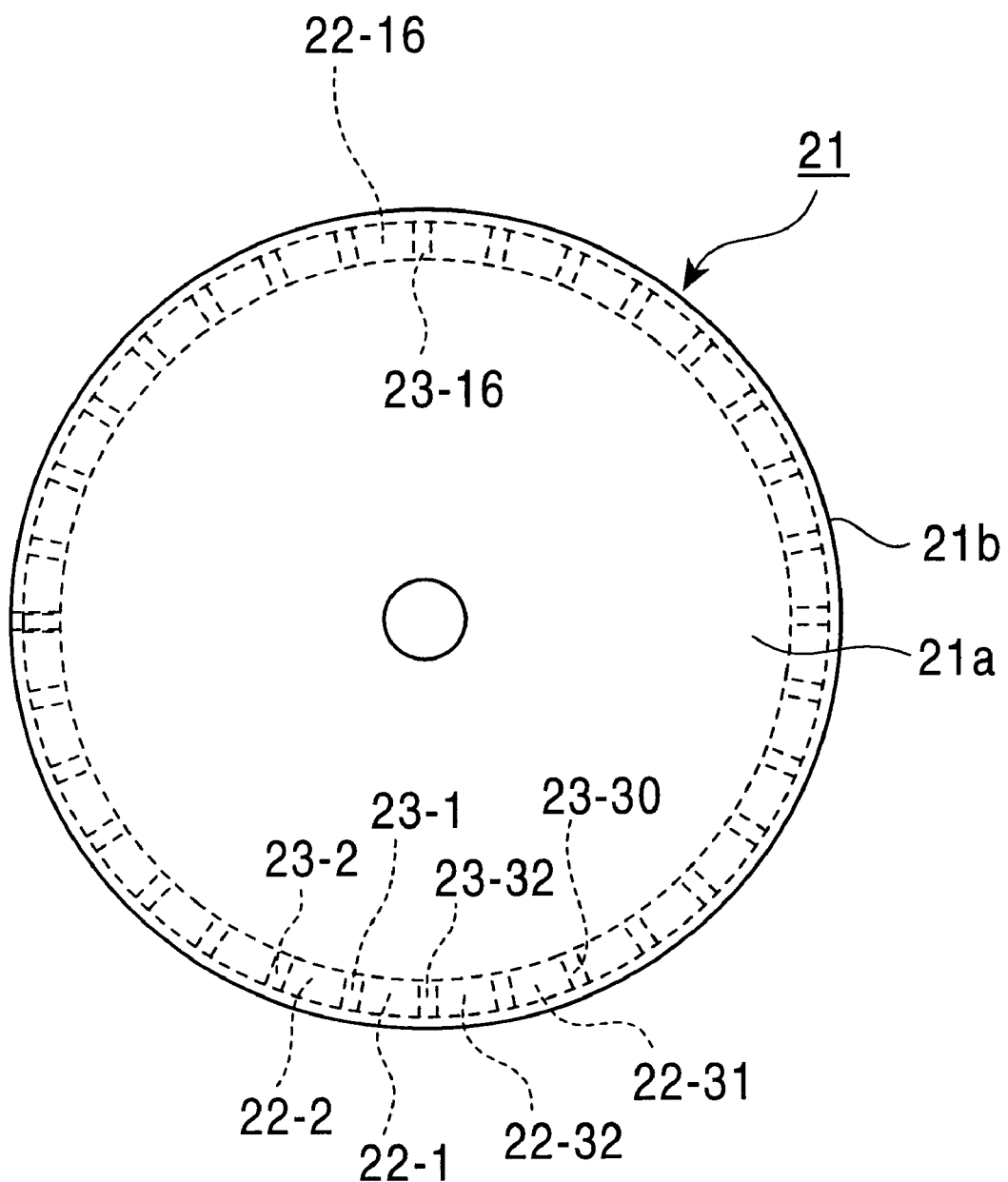
FIG. 8 is a plan view showing a rotor of the known brushless motor.
Figure 9:
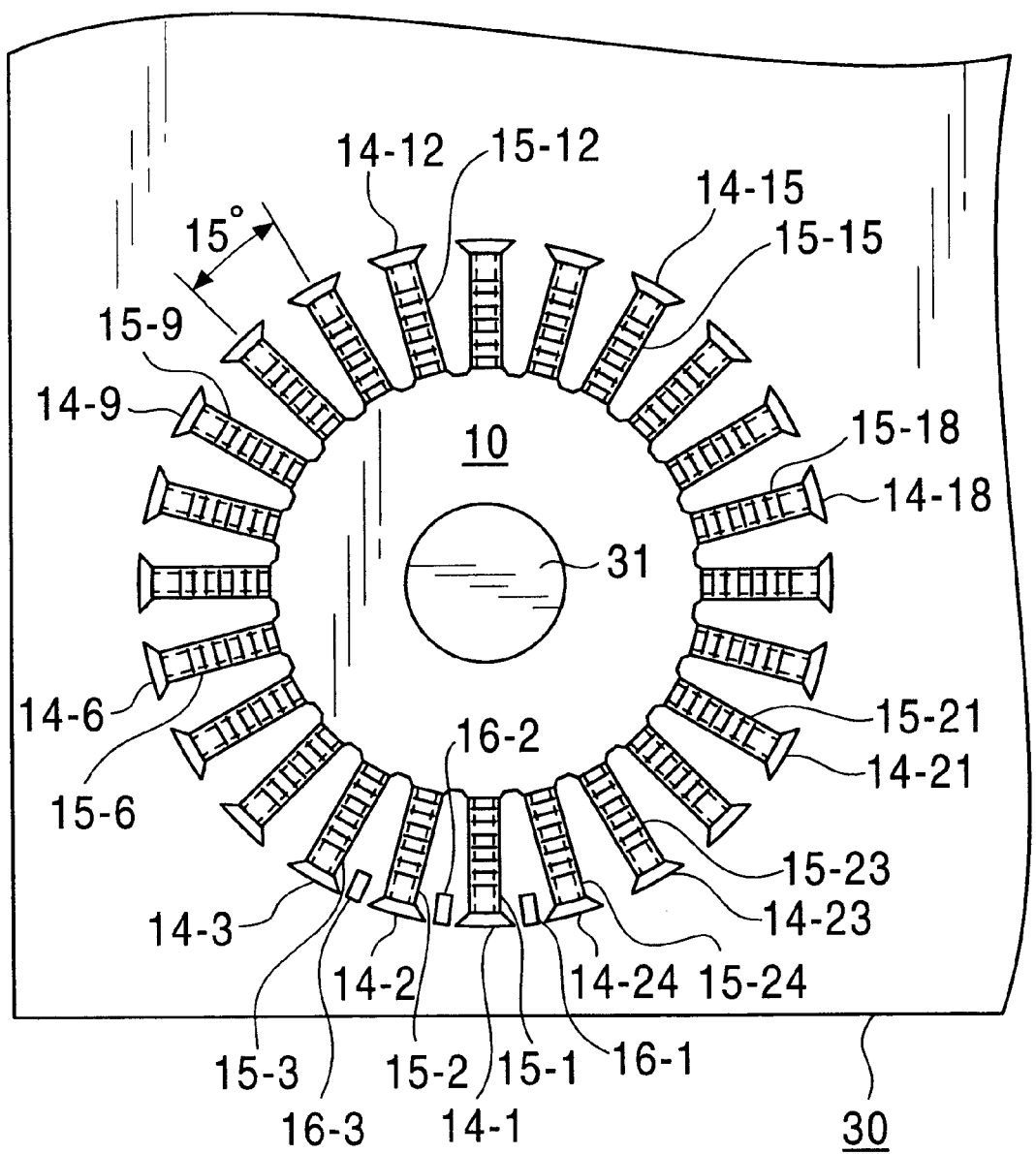
FIG. 9 is a plan view showing a stator and a reinforcing plate of the known brushless motor.

FIG. 5 is a sectional view showing a critical portion of a brushless motor according to the second embodiment of the present invention. In FIG. 5, the same units as in the first embodiment of the invention are represented by the same numerals used in the first embodiment.

The brushless motor according to the second embodiment is different from the brushless motor according to the first embodiment, in that the apertures 21c in the upper wall 21a of the rotor 20 are sealed with a nonmagnetic sealing material 23, such as a nylon resin or a polyacetal resin, as shown in FIG. 5. The remaining configuration is the same as in the first embodiment, therefore, a detailed description thereof is omitted for the second embodiment.

The configuration of the brushless motor according to the present invention is not limited to that described in the above first and second embodiments, in which the brushless motor is a three-phase brushless motor including twenty-four coils 15-1 to 15-24 in the stator, and thirty-two magnetic poles 22-1 to 22-32. The brushless motor according to the invention may be differently configured so as to be a three-phase brushless motor including six coils in the stator and eight magnetic poles in the rotor, or it may be a three-phase brushless motor including nine coils in the stator and twelve magnetic poles in the rotor. Generally, it may be a three-phase brushless motor having 3N coils in the stator and 4N magnetic poles in the rotor (N representing an integer of 1 or greater). The motor is not limited to three-phases but may be a multi-phase brushless motor.

The arrangement of the apertures 21c is not limited to that described in the first and the second embodiments, in which six apertures 21c having an angle of 45 degrees at the center are provided. In a three-phase (N-phase) brushless motor having substrates 14 disposed with an angular pitch P of 15 degrees, the brushless motor may include three apertures with a central angle Z of 90 degrees or 60 degrees. A brushless motor may be provided in any configuration subject to the expression $$(Z1+Z2+\ldots)=N\times P\times A$$

(A representing an integer of 1 or greater).

The arc-shaped channel apertures 32 in the reinforcing plate 30 may be sealed with a sealing material, such as a nylon resin or a polyacetal resin, according to the second embodiment, or the apertures 32 may be open, according to the first embodiment of the present invention.

The brushless motor according to the present invention is preferably applied to a spindle motor for rotating a magnetic recording-producing unit, such as a floppy disk.

What is claimed is:

1. A brushless motor comprising:
    a stator including a plurality of substrates protruding radially with respect to a center axis of the stator, and a plurality of coils, each coil being wound on each of said substrates;
    a rotor including a cover having a plurality of annularly arranged magnetic poles, for covering said stator, wherein said magnetic poles are disposed opposing tip-end faces of said substrates; and
    a plurality of first apertures provided in an upper wall of said cover, wherein said magnetic poles provided inside the upper wall of said cover and the tip-end faces of said substrates are visible from the outside of the upper wall through said first apertures.

2. A brushless motor according to claim 1, further comprising:
    a stator retained by a reinforcing plate of a magnetic material, said reinforcing plate including a plurality of second apertures, wherein said magnetic poles are visible from the outside of a bottom surface of said reinforcing plate through said second apertures.

3. A brushless motor according to claim 1, wherein said first apertures in the upper wall of said cover are sealed with a nonmagnetic sealing material.

4. A brushless motor according to claim 1, wherein the following condition is met:

$$(Z1+Z2+\ldots)=N\times P\times A,$$

wherein A represents an integer of 1 or greater, N represents the number of phases forming a current for said brushless motor, P represents an angular pitch between each of said substrates, C represents the number of said substrates, C and P satisfy $C\times P=360$ degrees, and $(Z1+Z2+\ldots)$ represents the sum of angular distances (Z1 degrees, Z2 degrees, . . . ) between both ends of each of said first apertures in the upper wall of said cover.

5. A magnetic recording-reproducing apparatus including a brushless motor, wherein said brushless motor comprises:
    a stator including a plurality of substrates protruding radially with respect to a center axis of the stator, and a plurality of coils, each coil being wound on each of said substrates;
    a rotor including a cover having a plurality of annularly arranged magnetic poles, for covering said stator, wherein said magnetic poles are disposed opposing tip-end faces of said substrates; and
    a plurality of first apertures provided in an upper wall of said cover, wherein said magnetic poles provided inside the upper wall of said cover and the tip-end faces of said substrates are visible from the outside of the upper wall through said first apertures.

6. A magnetic recording-reproducing apparatus including a brushless motor, according to claim 5, wherein said brushless motor further comprises:
    a stator retained by a reinforcing plate of a magnetic material, said reinforcing plate including a plurality of second apertures, wherein said magnetic poles are visible from the outside of a bottom surface of said reinforcing plate through said second apertures.

7. A magnetic recording-reproducing apparatus including a brushless motor, according to claim 5, wherein said first apertures in the upper wall of said cover are sealed with a nonmagnetic sealing material.

8. A magnetic recording-reproducing apparatus including a brushless motor, according to claim 5, wherein the following condition is met:

$$(Z1+Z2+\ldots)=N\times P\times A,$$

wherein A represents an integer of 1 or greater, N represents the number of phases forming a current for said brushless motor, P represents an angular pitch between each of said substrates, C represents the number of said substrates, C and P satisfy $C\times P=360$ degrees, and $(Z1+Z2+\ldots)$ represents the sum of angular distances (Z1 degrees, Z2 degrees, . . . ) between both ends of each of said first apertures in the upper wall of said cover.

* * * * *